United States Patent [19]

Jackson

[11] 4,415,105
[45] Nov. 15, 1983

[54] ARTICLE CARRIER APPARATUS

[76] Inventor: W. Shaun Jackson, 809 Sycamore, Ann Arbor, Mich. 48104

[21] Appl. No.: 317,720

[22] Filed: Nov. 3, 1981

Related U.S. Application Data

[63] Continuation-in-part of Ser. No. 229,820, Jan. 30, 1981, abandoned.

[51] Int. Cl.³ .............................. B62J 7/04; B62J 7/06
[52] U.S. Cl. .................................... 224/41; 224/30 A; 224/32 A; 224/36; 224/39
[58] Field of Search ...................... 224/36, 41, 42, 39, 224/32 R, 32 A

[56] References Cited

U.S. PATENT DOCUMENTS

| 444,089 | 1/1891 | Lamson | 224/41 |
| 619,376 | 2/1899 | White | 224/42 |
| 793,412 | 6/1905 | Bliss | 224/41 X |
| 2,492,595 | 12/1949 | Rhoer | 224/41 |
| 3,853,253 | 12/1974 | Hawkins et al. | 224/41 |
| 4,315,583 | 2/1982 | Hine, Jr. | 224/41 |

FOREIGN PATENT DOCUMENTS

| 22135 | 5/1917 | Denmark | 224/39 |
| 15030 | of 1913 | United Kingdom | 224/39 |
| 571217 | 8/1945 | United Kingdom | 224/32 R |

*Primary Examiner*—Allan N. Shoap
*Attorney, Agent, or Firm*—Krass, Young & Schivley

[57] ABSTRACT

Apparatus is provided for preventing unwanted movement, particularly anti-cantilever or upward pivoting movement, of a cantilever-supported carrier for a cycle, such as a front-or-back mounting article carrier on stem-supported handlebars or cross-bars of a cycle. The apparatus, particularly applicable to a carrier with a bent wire carrier frame having a rigid central loop portion for mounting with the respective reaches of the loop extending over the right and left handlebars or cross-bars and joining in cantilever relation with the handlebars or cross-bars stem, comprises means for rigidly securing the reaches adjacent the stem to prevent the mentioned anti-cantilever movement of a mounted carrier, preferably by latch means which are supportable by the stem.

14 Claims, 16 Drawing Figures

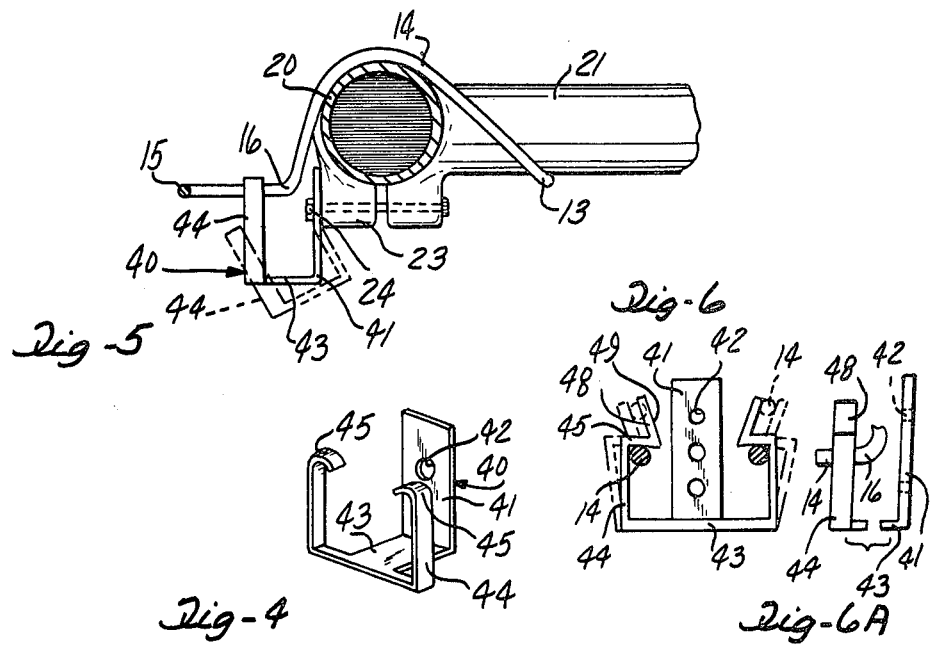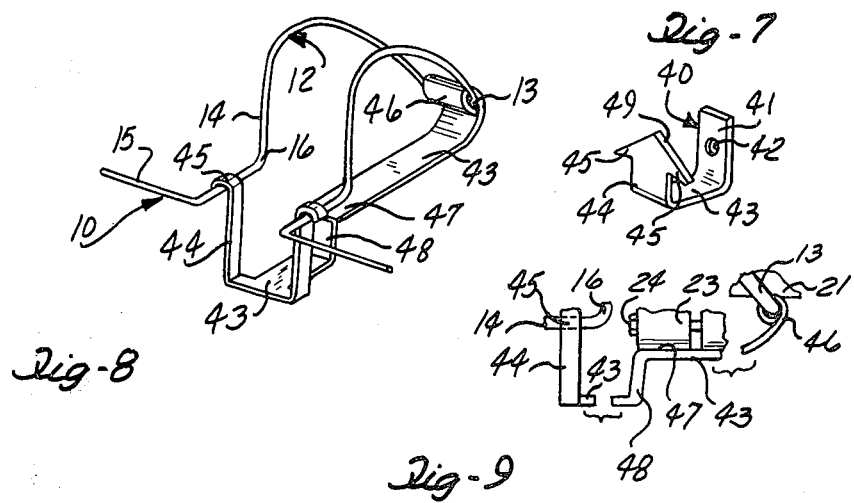

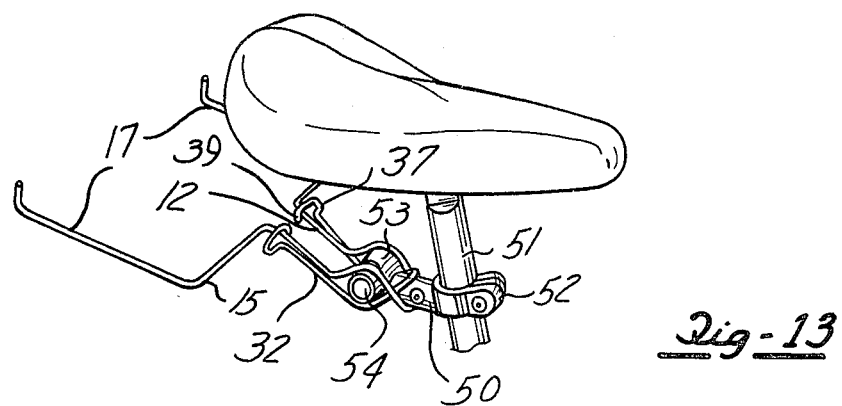
_Fig-13_
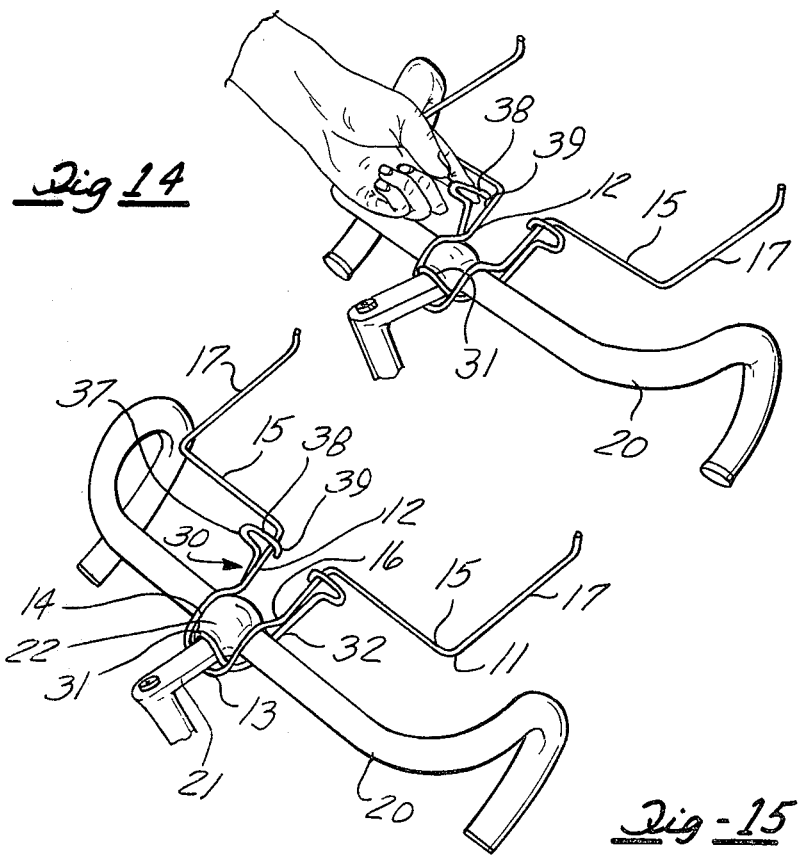
_Fig-14_
_Fig-15_

4,415,105

ARTICLE CARRIER APPARATUS

CROSS-REFERENCE TO RELATED APPLICATION

This application is a continuation-in-part of application Ser. No. 229,820 filed Jan. 30, 1981, now abandoned.

BACKGROUND OF THE INVENTION

1. Field of the Invention

This invention relates to an article carrier apparatus for preventing unwanted movement, particularly anti-cantilever or upward pivoting movement, of a cantilever supported carrier for a cycle such as a front-or-back mounting article carrier on handlebars or cross-bars of a cycle.

2. Prior Art

A conventional front-mounted article carrier and carrier frame for handlebars of a cycle are described in U.S. Pat. No. 4,066,196. The carrier frame is a so-called bent wire forward carrier which when front-mounted on the cycle, provides vertical and lateral support for an article carrier bag inserted in the carrier frame. The bag in turn is stabilized at its lower end by tension members attached to the front axle.

The conventional article carrier apparatus is generally stable in operation but is subject to unwanted upward pivoting or anti-cantilever movement particularly when the cycle hits a bump excessively or is unequipped with the bag and tension members.

An object of the present invention therefore, is to provide article carrier apparatus for cantilever supported mounting, such as front- or back-mounting on the handlebars or cross-bars of a cycle, which apparatus is adapted to be adjustably secured against unwanted movement, particularly anti-cantilever or upward pivoting movement.

Another object of the invention is to provide article carrier apparatus of the kind described which is readily mountable and demountable and which when mounted is adapted to be adjustably secured against unwanted interfering movement including lateral movement.

These and other objects, features and advantages will be seen from the following detailed description of the invention.

SUMMARY AND DETAILED DESCRIPTION

The present invention relates to an improvement in article carrier apparatus for mounting on right- and left projecting bar portions of stem-supported handle-bars or cross-bars of a cycle. The article carrier apparatus, of the type which includes a bent-wire carrier frame having a rigid central loop portion for mounting with the respective reaches of the loop extending over the right and left bar portions and joining in cantilever relation with the stem for supporting engagement therewith such that the bar portions provide support for the carrier frame, features the improvement comprising latch means for rigidly securing the reaches of the loop adjacent the stem (at a point of the respective reaches forwardly or rearwardly of the bar portions, as the case may be) such that anti-cantilever movement of the article carrier thus mounted is prevented. The improvement is applicable to article carrier apparatus for front-mounting preferably on handlebars of a cycle or for back-mounting preferably on cross-bars supported by the seat stem or extension thereof. In a preferred form the securing means is a latch which is supportable by the handlebar stem or seat stem (or extension thereof), and is engageable under compression with a portion of the top surface of the loop reaches. A preferred latch means is a pair of retention fingers, each of which is adjustably engageable with the respective right and left reaches of the loop, preferably either in front of the handlebars stem or at the rear of the seat stem (or extension thereof). In one preferred form, the latch means includes a rigid loop element which is secondary or complementary to the mentioned first or central loop portion, for mounting with the respective reaches of said loop element extending under the handlebars or cross-bars and joining over the handlebars upper stem or cross-bars stem for supporting engagement therewith. Preferably, the last mentioned latch means includes removably attachable opposed parallel bar or rod elements, for holding the loop portion and complementary loop element together under compression in front of the handlebars stem or at the rear of the seat stem (or extension thereof) as the case may be, preferably by means of a threadably engageable tying means for adjustably varying the degree of compression.

BRIEF DESCRIPTION OF THE DRAWINGS

The invention will be better understood by reference to the accompanying drawings in which:

FIGS. 1, 13 and 15 are each a perspective view of an article carrier according to the invention secured to the handlebars or cross-bars of a cycle;

FIG. 2 is a side view of an article carrier taken on line 2—2 of FIG. 1;

FIGS. 3, 4, and 7 are each a perspective view of latch means according to the invention;

FIG. 5 is a side view of the latch means of FIG. 4 mounted on a cycle stem hub clamp;

FIGS. 6 and 6a are front and side elevational views, respectively, of a latch according to the invention;

FIGS. 8 and 9 are a perspective view and fragmentary side view, respectively, of an article carrier embodiment according to the invention;

FIGS. 10, 11, 12, and 14 are each a perspective view illustrating steps in the mounting of an article carrier on a cycle.

Figure 1:
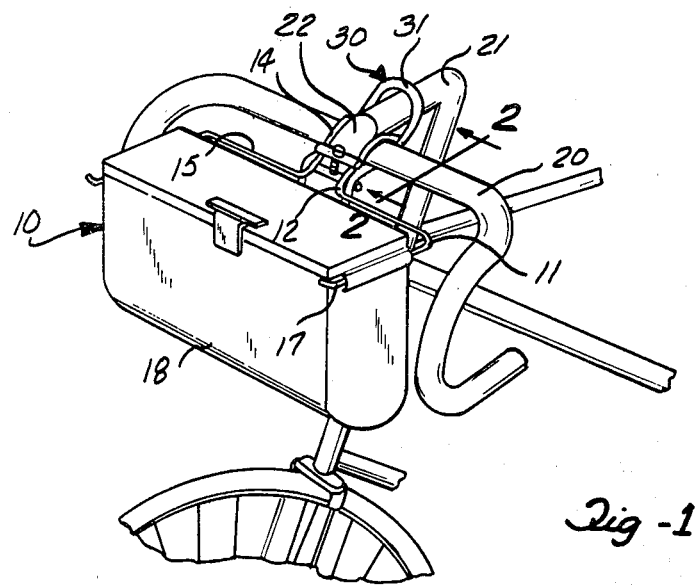

Referring to the drawings, the article carrier 10 of the invention as seen in FIG. 1 has a conventional frame 11 with a central loop portion 12 which has an end 13 (FIG. 2) and a pair of reaches 14. The frame is substantially rigid, somwhat flexible, and suitably may be of unitary bent wire construction. The frame is mounted on a cycle by placing the loop end 13 under the upper stem 21 with the reaches 14 extending forwardly in parallel over the right and left handlebars 20 closely adjacent the stem hub 22. Each of the loop reaches 14 has a bend segment 16 adjacent the stem front and thereafter first diverges outwardly in a lateral segment 15 and then projects forwardly in a parallel tine segment 17. A purse or utility bag 18 is carried within the perimeter formed by the latter tines. As a feature of the invention, the carrier 10 has a latch element for rigidly securing the loop reaches adjacent the stem front, which preferably may be supported by the stem or stem-hub and preferably is engageable under compression with a portion of the top surface of the loop reaches such as the bend segment 16.

In one preferred embodiment, the latch is in the form of a bracket 40 as seen in FIGS. 4 and 5 which has a base 41 for rigid attachment to the stem hub clamp 23 by means of a bolt inserted through the bracket aperture 42 and threadably received for clamping the hub. The bracket has a shank 43 supporting a pair of arms 44 which each terminate in a finger 45. The two fingers 45 are spaced apart so that they receive and retain the corresponding two loop reaches 14 under compression upon the handlebars 20. The bracket suitably can be made of metal which is flexible and bendable (in one or more of the base, shank, arm and finger portions) to the desired shape so that the lateral and vertical geometry of the fingers can be preset to any desired position adjacent the stem front somewhat as illustrated in dotted outline in FIG. 5. Preferably, the fingers are positioned in this manner not only for proper compression but also to retain and thus locate the reaches 14 laterally, preferably in abutment with the stem hub (that is, in the position shown in FIG. 1) so that the carrier is secured against unintended lateral movement on the handlebars. The preset feature of the invention thus advantageously assures that each time the carrier frame is remounted, the lateral and vertical positioning of the frame will be correct for a close and secure fit upon the hub.

In another preferred embodiment of the invention shown in FIGS. 6 and 6a, the latch finger 45 is provided with self-spacing extension finger or cam finger 48b. This embodiment advantageously provides for ease in latching the loop reaches during mounting. In particular, when the central loop portion 12 is mounted under the stem and over the handlebars, the loop reaches 14 are pressed down so that they contact the cam surface 49 at or near the bend segments 16, thus causing the fingers to be biased or spread apart (as shown in dotted outline in FIG. 6) until the loop reaches are brought down and received under compression below the fingers (which flex back), thus locking the carrier in correct position on the handlebars without causing undue manipulation or stress upon the latch bracket. FIG. 7 illustrates a similar self-spacing embodiment which has a pair of cam surfaces 49 which, during mounting, bias the compressed loop reaches outwardly for clearance below the paired fingers 45 and flexing back to the shank edges where the lateral spacing or width of the shank is such that the loop reaches are in correct abutment with the stem hub.

In yet another preferred, unitary embodiment (FIGS. 8 and 9) similar to that illustrated in FIG. 5, the latch member depends from the loop end 13 by means of a hinge 46. When mounted with the hinge engaged with the underside of the stem 21, the pivot portion 47 of the shank 43 bears upwardly upon the stem humb clamp 23. The shank has an offset 48a which in combination with the other latch elements serves when mounted to keep the loop reaches 14 under compression.

Figures 2, 3:
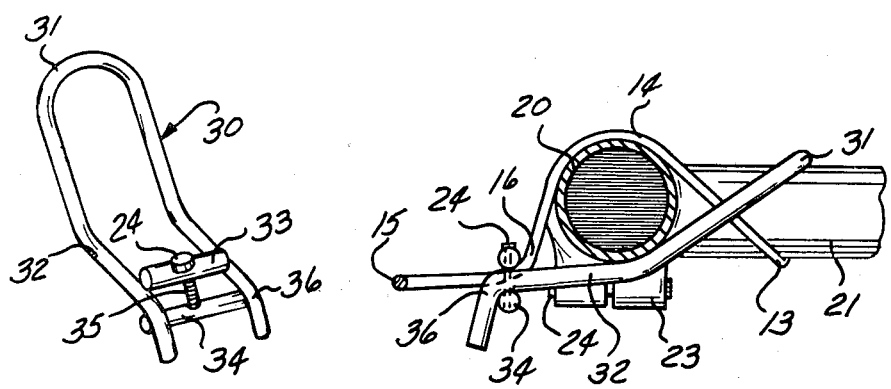

In the preferred embodiment illustrated in FIGS. 1, 2, and 3, the latch member includes a loop element 30, wider than and complementary to the central loop portion 12, having a loop end 31, parallel loop reaches 32 and bend segments 36. The latch member also includes bar or rod elements 33 and 34 adjustably spaced apart in parallel relation by bolt means or threadably engageable tying means 35. For mounting, as illustrated, the loop end is hung onto the top of the stem, and the loop reaches on each side are placed under the handlebars closely adjacent to and outside of the frame loop reaches 14, so that the end segments 16 and 36 closely coincide. The bar elements are then placed in the opposed parallel position illustrated, and the bend segments 16 and 36 are compressed together by tightening the bolt to the desired degree of compression. Desirably, loop 30 is more rigid than loop 12 and the spacing between the bend segments 36 is such that the compression serves to compress the bend segments 16 not only downwardly but also slightly inwardly so that the loop reaches are clamped laterally inwardly against the stem hub, thereby securing the carrier against both anti-cantilever or upward pivoting movement and lateral movement.

Figure 10:
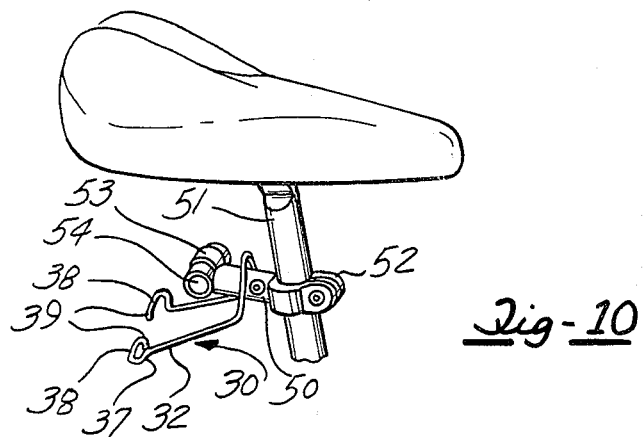
Figure 11:
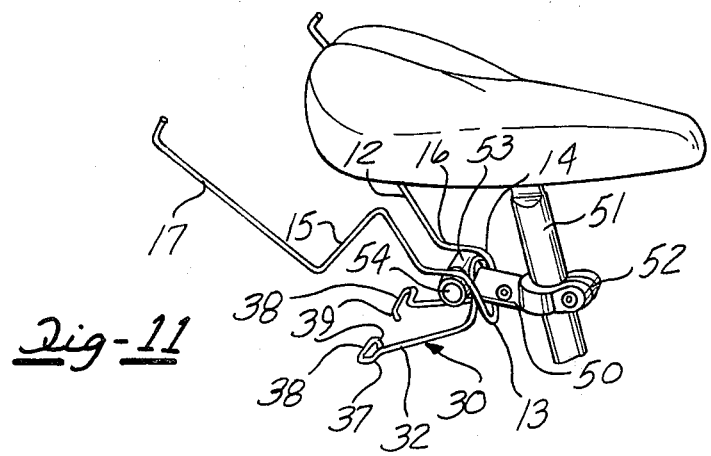
Figure 12:
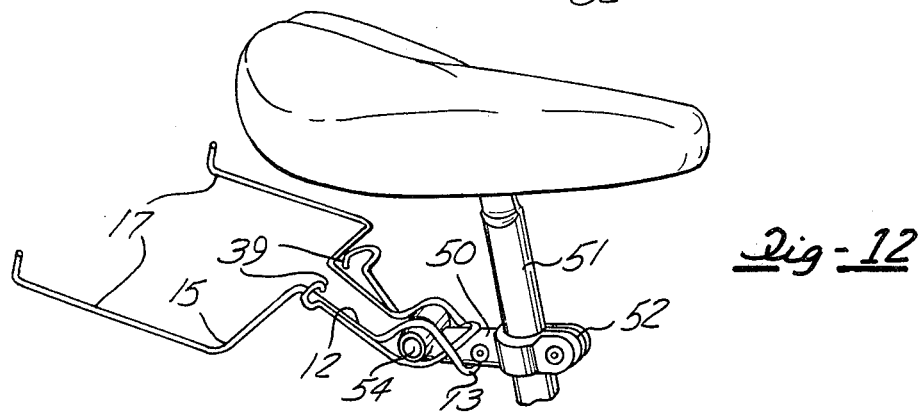

In the preferred embodiment illustrated in FIGS. 10, 11, 12, and 13, apparatus means are provided for the back-mounting of an article carrier on a cycle. As seen in FIG. 10, this apparatus includes a stem extension 50 adjustably and removably secured to the seat stem 51 by means of a seat stem clamp 52. At what may be regarded as the rear or end of the extension is a hub 53 that rigidly secures a cross-bar 54 having right-and-left projecting bar portions. The extension 50 and cross-bar 54 are dimensioned to receive and support a carrier frame 11 and a complementary flexible loop element 30 which in turn cooperate when locked together to provide cantilever and anti-cantilever support for a bag or other article. The loop element 30 includes a rounded end 31 extending as reaches 32 each of which terminates as a lateral segment 37, switchback bend 38 and retention finger 39. For backmounting, the extension 50 is secured to the seat stem by means of the clamp 52 as illustrated, and the loop element 30 is hung onto the extension by the loop end 31. The carrier frame 17 is then installed with its reaches 14 resting on the projecting bar portions and its loop end 13 under the extension 50, as shown in FIG. 11. In a final step, the frame 11 and loop element 30 are locked together as seen in FIGS. 12 and 13. For this purpose, the right and left reaches 32 are manually biased upwardly and inwardly by grasping the lateral segment 37 and switchback bend 38 and engaging the top and inner edge, respectively, of each of the frameloop reaches 14 with the end of bend 38 and the downwardly projecting retention finger 39, thus locking the frame securely against unintended anticantilever and lateral movements. The same preferred latch means are illustrated in FIGS. 14 and 15 for the front-mounting of a carrier on the handlebars of a cycle, for mounting by a similar procedure.

It will be understood that, while the invention has been described in reference to specific embodiments thereof, various changes and modifications thereof may be made and that all such changes and modifications are intended to be within the scope of the following claims.

I claim:

1. In an article carrier for mounting on handlebars of a cycle, including a bent-wire carrier frame having a rigid central mounting loop with the respective reaches of the loop extending over the right and left handlebars and including forward portions joining forwardly of the handlebars upper stem for supporting engagement with the handlebars and upper stem such that the handlebars provide cantilever support for the carrier frame, the improvement comprising a stem-supportable latch member having a pair of elongate resilient retention fingers, the first end of each of the retention fingers being fixedly secured to the latch members, the second end of each of the retention fingers projecting outwardly therefrom, the fingers being maintained generally parallel to each other and extending in a direction generally perpendicular to the forward portions of the reaches such that the second ends of the retention fingers may be flexibly biased until the reaches are flexibly received and maintained under compression in locking engagement with the retention fingers, thereby rigidly securing the reaches of the loop adjacent the stem front and preventing anti-cantilever movement of an article carrier thus mounted.

2. An article carrier according to claim 1 wherein the latch member is removably attachable to the stem hub clamp.

3. An article carrier according to claim 1 wherein the latch member depends from the loop.

4. An article carrier according to claim 1 wherein the latch member includes a rigid loop element complementary to the loop, for mounting with the respective reaches of said loop element extending under the handlebars and joining over the handlebars upper stem for supporting engagement therewith.

5. An article carrier according to claim 1 comprising adjustable set means for relocating the lateral position of the reaches.

6. An article carrier according to claim 5 wherein the relocating means is positionable to locate the reaches of the loop in abutment with the stem hub.

7. An article carrier according to claim 1 including means for adjustably varying the degree of compression.

8. An article carrier according to claim 1 wherein the latch member is a bracket, the bracket being supportable against upward movement by rigid attachment to the stem-hub clamp of the cycle.

9. An article carrier according to claim 8 wherein the retention fingers include opposed cam surfaces such that, for latching the reaches of the loop during mounting, downward engagement of the reaches upon the cam surfaces causes the fingers to be flexibly biased and spread apart until the reaches are brought down below the fingers whereupon the reaches are flexibly received in locking relation below the fingers.

10. In an article carrier for mounting on right-and-left projecting bar portions of stem-supported cross-bars of a cycle including a bent-wire carrier frame having a rigid central mounting loop with the respective reaches of the loop extending over the right and left bar portions and including longitudinally extending portions longtidinally spaced from the stem, the loop being in supporting engagement with the stem such that the bar portions provide cantilever support for the carrier frame, the improvement comprising a stem-supportable latch member having a pair of elongate resilient retention fingers, the first end of each of the retention fingers being fixedly secured to the latch members, the second end of each of the retention fingers projecting outwardly therefrom, the fingers being maintained generally parallel to each other and extending in a direction generally perpendicular to the longitudinally extending portions of the reaches such that the second ends of the retention fingers may be flexibly biased until the reaches are flexibly received and maintained under compression in locking engagement with the retention fingers, thereby rigidly securing the reaches of the loop adjacent the stem front and preventing anti-cantilever movement of an article carrier thus mounted.

11. An article carrier according to claim 10 adapted for back-mounting on a seat stem supported cross-bar.

12. An article carrier according to claim 11 including a stem extension integral with the cross-bar adjustably and removably attachable to the seat stem.

13. An article carrier according to claim 12 wherein the latch member includes a rigid loop element complementary to the loop, for mounting with the respective reaches of said loop element extending under the cross-bar and joining over the cross-bar stem extension for supporting engagement therewith.

14. In an article carrier for mounting around the handlebars, upper stem and stem-hub of a cycle, including a bent-wire carrier frame having a rigid central mounting loop with the respective reaches of the loop extending over the right and left handlebars and including forward portions joining forwardly of and under the handlebars upper stem for supporting engagement therewith such that the handlebars provide cantilever support for the carrier frame, the improvement comprising a stem-supportable latch member including a hinge means for hingedly connecting the latch member to the end of the central loop portion of the carrier, a shank extending underneath the stem to engage and bear upwardly upon the underside of the stem-hub for support against upward movement of the latch member, and a bracket fixably secured to the shank, the bracket having a pair of elongate resilient retention fingers, the fingers maintained generally parallel to each other, the first ends of each of the retention fingers being fixedly secured to the bracket, the second ends of each of the retention fingers extending in a direction generally perpendicular to the forward portions of the reaches such that the second ends of the elongate fingers may be flexibly biased until the reaches are flexibly received and maintained under compression in locking engagement with the fingers.

* * * * *